B. Worcester,
Scale Pencils,
N°. 60,315.     Patented Dec. 4, 1866.
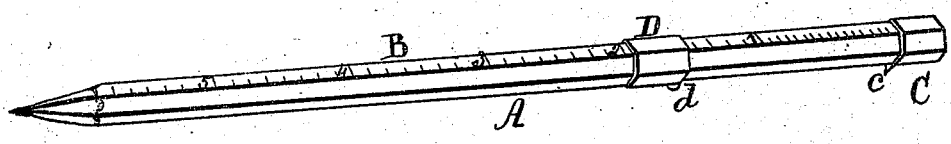
        
Witnesses;
Isaac K. Harris
Laurence Bradford
Inventor;
Benj. Worcester

United States Patent Office.

IMPROVEMENT IN SCALE PENCILS.

BENJAMIN WORCESTER, OF WALTHAM, MASSACHUSETTS.

*Letters Patent No.* 60,315, *dated December* 4, 1866.

SPECIFICATION.

TO ALL WHOM IT MAY CONCERN:

Be it known that I, BENJAMIN WORCESTER, of Waltham, in the County of Middlesex, in the State of Massachusetts, have invented a new and useful Combination of Pencil, Scale, Guage and Compasses; and I do hereby declare that the following is a full and exact description thereof, reference being had to the accompanying drawings, and to the letters of reference marked thereon.

On one or more sides of the wooden, metallic, or other case of a common writing or drawing pencil, A, I fix a measuring scale, B, with inches and parts of inches, or decimal parts of a foot. At or near one end of the pencil case, and at zero of the scale, I fix a small steel point, $c$, at right angles to the axis of the pencil, which, in the accompanying drawings, is secured to the pencil by a brass cap, C. A second point, or thin edge, $d$, is attached to the pencil in such manner as to slide freely the length of the pencil on the same side as the point $c$. In the drawings this second point $d$ is attached by means of a clasp of spring brass, D, upon one side, and the point itself, $d$, is a thin brass edge at right angles to the pencil, but leaning slightly toward the first point, $c$, and projecting a little more from the pencil, so that when slid close to the first point, it covers and protects it. The implement thus exhibited and described occupies scarcely more space than an ordinary pencil, and may be used at pleasure as a pencil, pocket rule, beam compasses for setting off distances or describing circles of a given radius, or as a guage for marking a line at a given distance from an edge. Pencils can be stamped with the scale at a trifling expense, and the attached points can be transferred with ease from a worn out pencil to a new one. I do not wish to confine myself to any particular scale or mode of fixing it on the pencil case, nor to any special form, material, or mode of attachment of the points to the case. All kinds of scale may be applied equally well. Pencils of a round, square, or any other section, may be used. A point of steel, black lead, soft metal, or other material, as well as of brass, may be used for the marking point. The sliding point may be sharp and the fixed point used to cover it. For shop or office use both points may be sharp and of equal length. With a metallic case for moveable leads the points would be more conveniently and nicely attached, and might be so arranged as to be withdrawn from view when not in use. For convenience of taking measure from the end of the pencil, it may be best, for some uses, to place the fixed point and the zero of the scale at the extreme end. For workshop use a larger size of pencil and more substantial attachments will be desirable. For engineer's, architect's and draughtmen's use, a finer and more accurate construction would make this implement more exact as well as more convenient than any now in use.

I do not claim the application of a fixed and a sliding point to a scale, as that has been used in beam compasses.

What I claim as my invention, and desire to secure by Letters Patent, is—

1. The combination of a fixed and a sliding point with a pencil, substantially as and for the purposes set forth.

2. The construction of a marking point with a thin curved edge, and so arranged as to cover and protect the other point when not in use, substantially as and for the purposes set forth.

3. The combination of pencil, scale and points, as an article of manufacture, substantially as and for the purposes set forth.

BENJ. WORCESTER.

Witnesses:
ISAAC K. HARRIS,
LAURENCE BRADFORD.